US009104936B2

(12) United States Patent
Bell et al.

(10) Patent No.: US 9,104,936 B2
(45) Date of Patent: Aug. 11, 2015

(54) MACHINE READING OF PRINTED DATA

(75) Inventors: Alan Joseph Bell, Fareham (GB); Martin Robinson, Waterlooville (GB); Guanhua Chen, Waterlooville (GB)

(73) Assignee: Wessex Technology Opto-Electronic Products Limited, Waterlooville (GB)

( * ) Notice: Subject to any disclaimer, the term of this patent is extended or adjusted under 35 U.S.C. 154(b) by 0 days.

(21) Appl. No.: 14/344,799

(22) PCT Filed: Sep. 14, 2012

(86) PCT No.: PCT/GB2012/052287
§ 371 (c)(1),
(2), (4) Date: Mar. 13, 2014

(87) PCT Pub. No.: WO2013/038207
PCT Pub. Date: Mar. 21, 2013

(65) Prior Publication Data
US 2014/0363081 A1 Dec. 11, 2014

(30) Foreign Application Priority Data

Sep. 16, 2011 (GB) .................................. 1116095.9

(51) Int. Cl.
*G06K 9/18* (2006.01)
*G06K 9/22* (2006.01)
*G06K 9/78* (2006.01)
*G06K 9/54* (2006.01)

(52) U.S. Cl.
CPC .. *G06K 9/18* (2013.01); *G06K 9/22* (2013.01); *G06K 9/54* (2013.01); *G06K 9/78* (2013.01); *G06K 2209/01* (2013.01)

(58) Field of Classification Search
None
See application file for complete search history.

(56) References Cited

U.S. PATENT DOCUMENTS 3,873,972 A * 3/1975 Levine .......................... 382/161
4,130,819 A 12/1978 Engelmann
(Continued)

FOREIGN PATENT DOCUMENTS

EP 0 539 854 A2 10/1992
JP 2077891 A2 3/1990

*Primary Examiner* — Stephen R Koziol
*Assistant Examiner* — David F Dunphy
(74) *Attorney, Agent, or Firm* — Dicke, Billig & Czaja, PLLP

(57) ABSTRACT

A method of reading data represented by characters formed of an x by y array of dots, e.g. as printed by a dot-matrix printer, is described. An image of the character(s) is captured by a digital camera device and transmitted to a computer, and by using analysis software operating in the computer to which the camera image has been sent, dot shapes are identified and their positions within the captured image detected, using the similarity of dots to idealized representations of dots using a combination of covariance, correlation or color data. The position information about the detected dots is then processed to determine the distance between dots and to identify "clusters" of adjacent dots in groups of dots close to one another, and to enable such clusters to be mapped on to a notional x by y grid that defines the intended positions of the dots where grid elements intersect. The image is then analyzed to determine, for each intersection of the grid, whether a dot is present or not, and starting at one corner of the x by y grid, a binary number is generated corresponding to the presence or absence of a dot at each intersection. This binary number is compared with the binary number in a reference table of binary numbers referenced to information corresponding to a dot-matrix printed character, and an output then produced corresponding to the character(s) identified. By using Reed Solomon mathematics, characters which have been misprinted can still be reliably identified.

6 Claims, 5 Drawing Sheets

Forming a Number Based on Detected Dots

(56) References Cited

U.S. PATENT DOCUMENTS

| | | |
|---|---|---|
| 5,025,479 A | 6/1991 | Pastor |
| 5,212,741 A | 5/1993 | Barski et al. |
| 5,394,482 A * | 2/1995 | Hadgis .......................... 382/173 |
| 5,504,822 A * | 4/1996 | Holt ............................... 382/218 |
| 2004/0024716 A1* | 2/2004 | Malatesta et al. ............. 705/410 |
| 2006/0154559 A1* | 7/2006 | Yoshida ......................... 446/297 |

* cited by examiner

⑆0⑈204 5078⑈⑈⑈⑈02
Figure 1 - Magnetic Ink Character Recognition Fonts
Figure 2 - UPC Barcode for "123456789012"
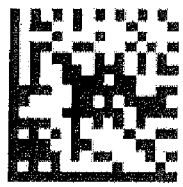
Figure 3 - Data Matrix Code
123456789012
Figure 4 - OCR A Font
⌐⌐⌐⌐⌐⌐⌐⌐⌐⌐⌐⌐
Figure 5 Lower Half of OCR-A Characters

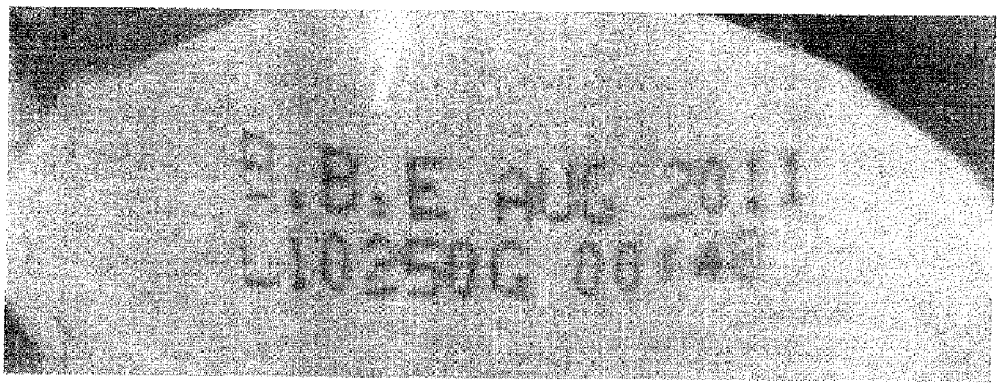
Figure 6 CIJP Characters printed on a curved surface
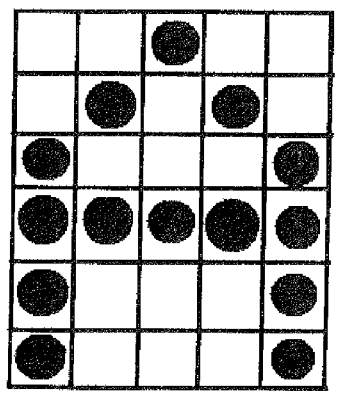
Figure 7 - Dot Spacing Delta-X and Delta-Y

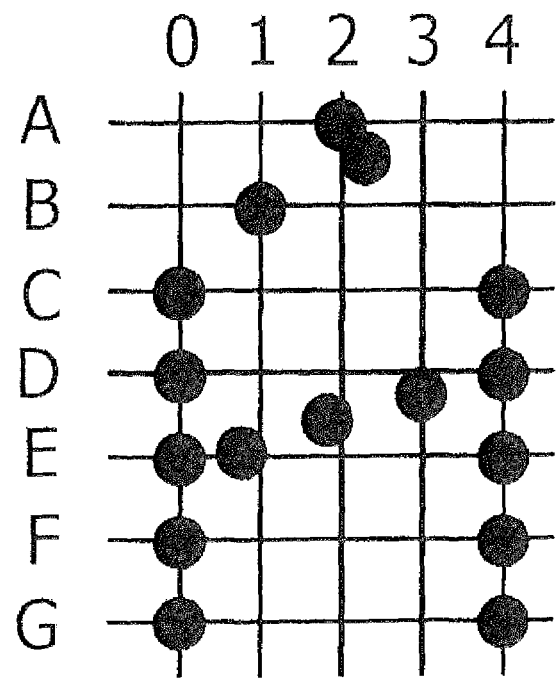
Figure 8 - Coalesced Dots and Out of Position Dots
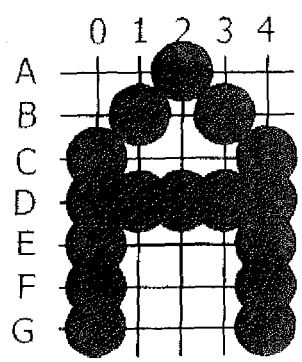
Figure 9 - Small Delta-X and Delta-Y so that Dots Overlap

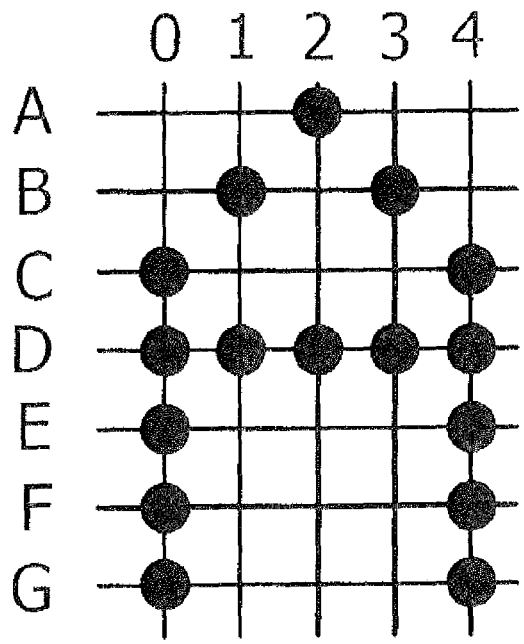
Figure 10 - Forming a Number Based on Detected Dots
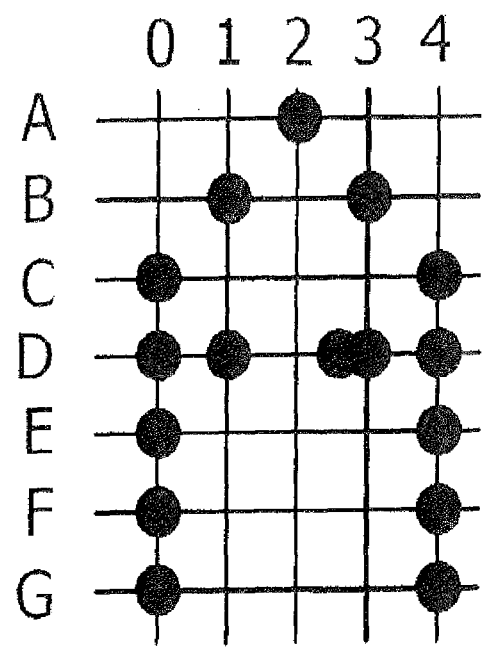 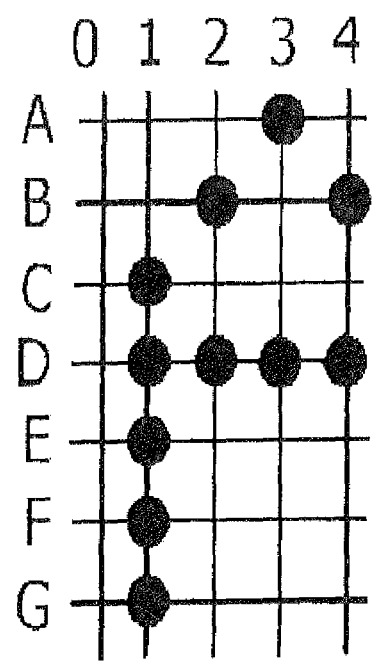
Figure 11 - Creating Vectors for Coalesced Dots and Poor Clustering

MACHINE READING OF PRINTED DATA

This invention relates to machine reading of printed data.

BRIEF DESCRIPTION OF THE FIGURES

FIG. 1 is an illustration of a magnetic ink character recognition font

FIG. 2 is an illustration of a universal product code (UPC), or barcode.

FIG. 3 is an illustration of a data matrix code.

FIG. 4 is an illustration of characters in the OCR-A font.

FIG. 5 is an illustration of the lower half of the characters of FIG. 4.

FIG. 6 is an illustration of certain CIJP characters printed on a curved surface.

FIG. 7 is a schematic illustration of dot spacing (delta-X and delta-Y).

FIG. 8 is a schematic illustration of coalesced dots and out-of-position dots.

FIG. 9 is a schematic illustration of small delta-X and delta-Y values such that dots overlap.

FIG. 10 is a schematic illustration of the formation of a number based on detected dots.

FIG. 11 is two schematic illustrations of the creation of vectors for coalesced and dots and for poor clustering, respectively.

Figure 12:
FIG. 12 is an example of a marking printed with a dot-matrix printer and using a Latin character set.

In the modern world, there are numerous areas where a process can be made viable or enhanced, because a computer system gains access to information printed on a product or document. Machine readable information is normally encoded to suit the process used for reading the data. Over the years, many systems have been developed and implemented to read printed information. The following are examples:

MICR (MAGNETIC INK CHARACTER RECOGNITION)

Magnetic Ink Character Recognition (MICR) font is shown in FIG. 1. As can be seen, this is a highly stylised font which, when printed with magnetic ink, produces an image which can be scanned by a magnetic scanning head to produce an identifiable series of pulses, which can be decoded to allow the individual characters to be machine read and then data processed as desired.

MICR characters can be read by eye, so if the MICR data is not adequately captured and decoded properly when read by machine, this can be detected and manual information input by an operator e.g. via a conventional keyboard or keypad.

UPC Barcodes

These are printed on consumer products and operate in a similar way to MICR. As can be seen from a typical example, reproduced in FIG. 2 attached hereto, the black/white bar pattern is suitable for reading by machine, normally via a hand-held bar code scanner or laser scanner e.g. at a supermarket checkout. Human readable data is replicated at the lower edge of the bar pattern to allow manual entry of the code if the bar pattern is unreadable by scanner. The ability of a human operator to enter the data in the event of a problem with machine reading is incorporated into the design of the UPC code. However, this constrains the code to be represented in numbers only if it is intended to work internationally as people in Japan, for instance, may not recognise Latin characters or have a keyboard or screen capable of supporting non-Kanji script. The code is restricted to numbers only.

This numeric character restriction means that codes are longer than they need to be, e.g. UPC codes contain 12 digits and one check digit. However, if the conventional digits could be combined with the 26 characters from the Latin alphabet, making 36 symbols available, the same information can be represented as 8 alpha-numeric digits.

MICR characters and the UPC barcodes comprise characters and symbols that are carefully designed and printed according to tightly defined tolerances which enable reliable machine reading. Both of these systems have a specified backup—manual data entry—should the intended reading method fail.

Datamatrix Markings

The attached FIG. 3 shows a typical datamatrix marking. As can be seen, it consists of a 16×16 array of black or white squares which can be scanned using a suitable scanner to produce the data represented by the marking as a series of 0s and 1s. As can be seen, the datamatrix code shown in FIG. 3 contains no human readable components. However, such codes have achieved rapid and worldwide adoption, where the coding symbology is well-known and printing quality is controlled by international standards. These codes may be found on industrial products, where robotic cameras can verify parts being fitted in assembly processes, or on advertising enabling people with smart phones to secure more information about the product or service in question by having the phone camera capture the code.

Datamatrix codes contain additional error correction information generated, for example, by Reed-Solomon (RS) arithmetic that allows the data within the code to be read correctly if some of the black or white cells are printed incorrectly, or dirt has contaminated the surface of the code.

RS error correction is well-known; generally a string of data is represented as symbols, and in the encoding process the data to be protected is processed to create a set of parity symbols that are added to the original symbols. The symbols representing data and parity symbols are then transmitted or recorded in some manner.

After reception or reading the data the data symbols and parity symbols are processed according to the original RS arithmetic to determine if any errors have occurred in the transmission process. If no errors occurred the parity symbols are disregarded and the original data is extracted from the data symbols. If the RS arithmetic has determined that some of the received data has been received incorrectly the parity symbols are used to correct the mistakes. Depending on the transmission medium, the received symbols can be determined as errors (the wrong symbol detected) or erasures (no symbol detected). The RS algorithms allow that for A symbols of data and B symbols of parity the number of symbols that can be corrected are:

$$2 \times \text{error symbols} + y \text{ erased symbols, where } x+y <= B$$

If the combined number of errors and erasures are greater than B in the formula above then the RS arithmetic can cause mis-correction where correctly received symbols are wrongly corrected—this means the original data is lost.

Optical Character Registration (OCR)

This system was developed using data printed with an Optical Character Recognition (OCR) font, the numerals in one form of which are shown in FIG. 4. The letter forms in such fonts are intended to be machine readable and for this purpose have been designed with carefully and tightly controlled character shapes. As shown in FIG. 5, the characters in the OCR font shown are unique with each differing materially from the remainder, even if only the bottom half of each character is considered.

There are different types of OCR processes. The characters in FIG. 4 are designed to be read by template matching and errors in the shape of the printed characters reduce the degree of match to the template. The OCR system has been expanded in practice to cope with machine reading of data not printed using an OCR font. OCR software decomposes a scanned signal derived from each character into component parts, loops, joins and curves etc in order to provide derived data on the basis in which a recognition process can be performed.

The above four systems are widely used to provide machine-readable data on products or documents, but there are many instances where a product or document needs to carry other data, some of which intended to be read otherwise than by machine, for example "sell-by dates" printed on to the wrapping or packaging of perishable products. "Sell-by" data allows a consumer to make purchasing and consumption decisions and, e.g., supermarket staff to make storage/retention decisions. Such data is often applied to already-existing printed material such as a label or canister by Continuous Inkjet Print (CIJP) usually using a standard dot based character set such as shown in FIG. 6 using inks intended for the particular type of substrate in question, e.g. metal, wet or dry glass, paper, card, plastics. Printed information conventionally applied to products by CIJP may include a variety of data, for example article number data, batch information, use- or sell-by date information.

One reason CIJP printing is used for applying "sell by" dates and other customer relevant data is because it can be applied at production line speeds. It also allows data to be changed from product to product and, since the printer head does not need to be in contact with the item being printed, which may be dangerous or impossible in the case of a glass bottle or a rounded plastic product, it can be used with a wide variety of substrates. Because of the customer's ability to make out the intended information from poor or irregular printing, the need for high quality tight tolerance printing simply does not apply.

CIJP characters are normally intended to be printed as an array of dots arranged on a notional rectangular grid at nominal even spacing horizontally and vertically, as shown in FIG. 7 for the letter "A". This separation of the dots is intended to be uniform (Delta-X, Delta-Y)—the notional gridlines shown in FIG. 7 define boxes showing the intended positions of the dots. However, in practice, contamination of the print head can cause dots to coalesce or be out of position when printed, for example as shown in FIG. 8 where the dots are intended to fall on the intersections of the 5 by 7 notional rectangular grid. If the characters are printed on a curved surface, e.g. a bottle as shown in FIG. 6, the spacing between dots can vary within a block of printed data. The variable nature of the finished printing, due to contamination or irregular surfaces means that practical machine reading of the printed CIJP data after the product has been sold, or whilst it is in distribution, is not possible using existing OCR techniques, though it is known to use camera-based inspection systems to read CIJP data applied to products on a production line immediately after printing, in order to check that the problems identified above (dots out of position, or coalescing) are not occurring. Such systems operate in a well-defined environment, with controlled lighting and a high quality industrial camera at a known distance from the printed surface. These systems also co-operate closely with the printer applying the data, comparing the data sent to the printer with an image of the finished result. Alternatively an industrial camera arrangement may use configuration settings defining the Delta-X and Delta-Y and other CIJP print parameters and the signals from the camera can be processed by suitable software to check for characters meeting these preset requirements. Such CIJP print quality checking software will typically define Region of Interest (ROI) information such that only part of the image within the ROI is checked for character data.

One approach to machine-readable inscriptions using OCR techniques has been suggested: the printer is set to have small Delta-X and Delta-Y so as to form the characters with the dots overlapping as shown in FIG. 9. This is intended to allow conventional OCR software to operate.

We have now found that by combining certain image analysis techniques in a novel way, data printed using characters formed of an array of dots, typically produced by CIJP, may be read electronically.

According generally to the present invention, a method of reading data represented by characters formed of an x by y array of dots, is carried out using the following sequence of steps:

a) an image of the character(s) is captured by a digital camera device and transmitted to a computer;

b) by using analysis software operating in the computer to which the camera image has been sent, dot shapes are identified and their positions within the captured image detected, using the similarity of dots to idealised representations of dots using a combination of covariance, correlation or colour data;

c) the position information about the detected dots is processed to determine the distance between dots and to identify "clusters" of adjacent dots in groups of dots close to one another;

d) the dots are combined to form an x by y grid that defines the intended positions of the dots where grid elements intersect;

e) the image is analysed to determine, for each intersection of the grid, whether a dot is present or not;

f) for each group, starting at a given fixed position, following a predefined sequence, preferably starting at one corner of the x by y grid and proceeding row by row, generating a binary number corresponding to the presence or absence of a dot at each intersection;

g) this binary number is compared with the binary number in a reference table of binary numbers referenced to information corresponding to a dot-matrix printed character, and h) providing an output formed by assembling together the characters identified by such comparison.

The reference table preferably includes numbers corresponding to poorly printed characters (for example with coalesced dots or characters with some dots missing). The reference table preferably includes the dot matrix pattern used to print a character, the character itself, an indication of the alphabets, for example Roman, Kanji etc., and a Hamming distance corresponding to the amount of difference between the binary number for a perfectly printed character and the binary number for a poorly printed representation of the same character. In such a table, a particular dot pattern/binary number may be present more than once to show a possible match to different characters, but the binary numbers in the entries in the table will be associated with the different Hamming numbers.

The generation of the binary number in step f), reflecting the letter form shown in FIG. 10, is as follows:

| | |
|---|---|
| In binary | 10001 10001 11111 10001 10001 01010 00100 |
| Binary (4-bit grouping) | 100 0110 0011 1111 1000 1100 0101 0100 0100 |
| Hexadecimal | 4 6 3 F 8 C 5 4 4 |

The inclusion of numbers corresponding to poorly printed characters enables the rapid recognition of characters where, for example, the cluster to be recognised is formed lower or higher or to the left or right of the intended position or for common printing faults. Examples are shown in FIG. 11.

The Hamming distance which constitutes a component of each reference number is a measure of how far the binary representation of a perfectly printed character is from a binary representation of a misprinted character. The Hamming distance is the number of times a mismatch occurs, taken on a bit-by-bit comparison of the two binary numbers. Thus if, in the misprinted version, just one dot was missing, the Hamming distance would be 1. If there was an additional dot as well as one dot missing, the Hamming distance would be 2.

The comparison described in step g) is preferably undertaken on a bitwise basis between the binary number and the binary number part of the reference table, for each entry in the reference table. This identifies good matches and close matches where the pre-stored vector has a Hamming distance of e.g. one or two.

At the end of the comparison, the perfect match and any near matches (and their respective Hamming distances) are recorded for each character. The character and the Hamming distance(s) between the unknown characters are stored, yielding a set of possible results, which can be thought of as candidates.

The candidate results may then be subjected to analysis against any set of predefined rules for the composite string of characters that may be expected. For example, if it was known that numbers only were to be expected, a comparison result yielding a alphabetic character, even as a perfect match, could be disregarded and the response with the next lowest Hamming distance used.

The combination of characters so decoded form a sequence of alpha numeric numbers (decoded string) showing the Hamming distance and the resulting uncertainty of each decoded character.

The final steps in the character recognition process may include the application of Reed Solomon or other error correction and detection methods to the decoded string using the Hamming distance for the detected characters to indicate which characters could be classed as erased or to generate alternate candidate characters to seed the Reed Solomon process and check for substitutions or miss-corrections that may arise from the Reed Solomon process. If this analysis produces a repeated error, it is possible to add a further entry to the reference table to eliminate the error in future recognition processes.

By way of example, consider the inscription shown in FIG. 12 which shows a security code marking printed with a dot-matrix printer and using a Latin character set.

As shown, the first line reads EBAH 6NS8 NO6A AYD9, and if there were no printing errors that ought to be read accurately by the steps outlined above. If, however, for example the first symbol had two dots missing from the bottom row, the table process described above would yield E with a Hamming distance of 2 and F with a Hamming distance of 2.

The software may be programmed then to test the array of numbers twice in a Reed Solomon process, in a first pass with an E in the first position, and on the second pass with an F in the first position. This ought to result in an improved final result, i.e. a decoded marking with a high probability of accurately reflecting the original.

If the character in the first position was badly damaged and had no close matches (say Hamming distance greater than 5), a third Reed Solomon process could be executed, with the character position denoted as an "erasure" (a known Reed Solomon process technique).

In the example above, more than 3 incorrect characters input to the algorithm would yield the wrong answer, whereas up to 6 erasures, characters can be properly corrected. Thus, to do the Reed Solomon process correctly, it is vital to know the reliability of the symbol recognition process, hence the usefulness of poorly printed characters in the reference set, each with the Hamming distance between the degraded character image and its Hamming distance.

Figure 13:
FIG. 13 is an example of a marking printed with a dot-matrix printer and using a Cyrillic character set.

The present invention may be applied to a wide variety of inscriptions on products, for example inscriptions which combine product, date and other information into an alpha-numeric set of symbols using numbers and Latin characters and which can be augmented with Reed Solomon error correction characters. By using suitable "translation" software, Roman alphabetic characters can be substituted for a set of non-Roman characters used to reflect the language of the intended viewer. Thus a product intended for sale in Russia, for example, will be printed using numbers and Cyrillic characters. An example of this is shown in FIG. 13. Should electronic reading fail and a customer needs to enter data, it is likely that the local keyboard and computer screen will support these characters and the customer will be more likely to be able to recognise these characters than if they were printed with the Roman alphabet. The method of representing the product date and other information may be further processed to obfuscate the original product code.

Although the invention has been described with reference to characters printed by CIJP, the method can be applied to characters printed with other printing technologies, provided that the font used is a dot matrix one.

The present invention is of particular value in circumstances where an inscription in dot-matrix character form, needs to be read from a product being distributed or is with an end customer. In these situations, there can be no reference to the original data that has been printed. The camera capturing the image of the data may be an inexpensive camera as found in a Smart phone, or a high quality camera that a professional may use. In these situations, the placement of the code relative to the camera will be undefined, and the background data will include other random information in the picture, such as the hand of the person holding the item bearing the CIJP printed data. The lighting in use will be undefined. Reflections in the image may be caused by sunlight reflecting from a glass surface. However, the approach identified above can extract the information without difficulty.

The above approach to machine reading of dot matrix printed inscriptions works well with standard dot matrix printing produced in accordance with known character sets. Those character sets, however, were developed from the point of view of readability by eye so that they can be read by consumers and others. We have now found that, without overly compromising human eye readability, improvements in character recognition of dot matrix printed characters achieved by using the method of the invention can be secured in terms of the reduction in error rate, i.e. fewer false attributions by adjusting the positions of the dots in a dot matrix representing a particular character to improve character recognition when that is carried out by the method of reading data in accordance with this invention.

Thus, in a preferred embodiment, the method is applied to read printed data which is applied to a surface, for example directly on a product in a form that is at the same time human and machine readable, the data consisting of alphabetic and numeric symbols represented by an array of dots, and where some of the dot positions are shifted from the standard positions in a corresponding standard dot-matrix font relative to the others in the same character or symbol whereby to enable improved recognition of each symbol using Reed Solomon processing techniques. A high degree of data efficiency can be secured by using such an approach. The font may be of any desired alphabet, for example Latin, Cyrillic, Chinese or Katakana, to enable the effective use of the methods in different regions of the world.

Put another way, the efficacy of the machine reading of printed data in accordance with the present invention can be enhanced if the set of characters constituting the dot-matrix typeface used to print the data has, in the case of at least some of the characters, dots located in positions other than those occupied by the standard dot-matrix typeface design for a particular x by y grid. Items bearing printed data of this type constitute a further feature of this invention.

The invention claimed is:

1. A method of reading data represented by characters of an array of dots associated with a notional x by y grid, and located on a surface, the method including the following sequence of steps:
   a) capturing an image of the character(s) by means of a digital camera device;
   b) transmitting the so-captured image to a computer;
   c) identifying by means of analysis software operating in the computer to which the camera image has been transmitted using the similarity of dots to idealised representations of dots using a combination of covariance, correlation or colour data;
   d) processing the position information relating to the detected dots to determine the distance between dots and to identify "clusters" of adjacent dots in groups of dots close to one another;
   e) combining the dots in each group and associating with each such group an x by y grid with the majority of the dots in each group being positioned at points where the grid elements intersect;
   f) analysing the image of each group to determine for each intersection of the x by y grid whether a dot is present or not;
   g) for each group, starting at a given fixed position, following a predefined sequence, generating a binary number corresponding to the presence or absence of a dot at each intersection;
   h) comparing this binary number with binary numbers in a reference table of binary numbers referenced to information corresponding to a dot-matrix printed character for each group to determine a best match, and
   i) providing an output formed by assembling together the characters identified by such comparison.

2. A method according to claim 1 wherein in step g) the fixed position is at one corner of the x by y grid and the sequence proceeds row by row.

3. A method according to claim 1, in which the reference table used in step h) includes numbers corresponding to poorly printed characters.

4. A method according to claim 1, in which the reference table used in step h) includes at least one of the dot matrix pattern used to print a character itself, an indication of the alphabet to which the character belongs and a Hamming distance corresponding to the amount of difference between the binary number for a perfectly printed character and the binary number for a poorly printed representation of the same character.

5. A method according to claim 1, in which the comparison described in step h) is undertaken on a bitwise basis between the binary number and the binary number part of the reference table, for at least one entry in the reference table.

6. A method according to claim 1, further comprising following at least one of perfect matches and near matches (and their respective Hamming distances) are recorded, and subjected to analysis against a set of predefined rules tailored to the features of the set of expected characters.

* * * * *